United States Patent
Wang et al.

(10) Patent No.: US 7,242,708 B1
(45) Date of Patent: Jul. 10, 2007

(54) EQUALIZED PARALLEL INTERFERENCE CANCELLATION EPIC FOR CDMA SYSTEMS

(75) Inventors: Haifeng Wang, Espoo (FI); Zhiyong Bu, Espoo (FI); Jorma Lilleberg, Espoo (FI)

(73) Assignee: Nokia Corporation, Espoo (FI)

( * ) Notice: Subject to any disclaimer, the term of this patent is extended or adjusted under 35 U.S.C. 154(b) by 804 days.

(21) Appl. No.: 10/148,517

(22) PCT Filed: Oct. 6, 2000

(86) PCT No.: PCT/EP00/09825

§ 371 (c)(1),
(2), (4) Date: Aug. 13, 2002

(87) PCT Pub. No.: WO02/29993

PCT Pub. Date: Apr. 11, 2002

(51) Int. Cl.
*H04B 1/69* (2006.01)
*H04B 1/707* (2006.01)
*H04B 1/713* (2006.01)

(52) U.S. Cl. ............ 375/148; 375/147; 375/130; 375/316; 375/346

(58) Field of Classification Search ............ 375/148, 375/147, 130, 316, 346
See application file for complete search history.

(56) References Cited

U.S. PATENT DOCUMENTS 5,305,349 A   4/1994 Dent (Continued)

FOREIGN PATENT DOCUMENTS

JP   07-508393   9/1995

(Continued)

OTHER PUBLICATIONS

Divasalar D et al: "Improved Parallel Interference Cancellation for CDMA" IEEE Transactions on Communications, IEEE Inc. New York, US, vol. 46, No. 2, Feb. 1, 1998, pp. 258-268, XP000734697.

(Continued)

*Primary Examiner*—David C. Payne
*Assistant Examiner*—Jia Lu
(74) *Attorney, Agent, or Firm*—Cohen Pontani Lieberman & Pavane LLP (57) ABSTRACT

A new multiuser detection scheme EPIC (Equalized Parallel Interference Cancellation) is disclosed. A rake receiver signal zRake output by a rake receiver is detected, which receives a spread spectrum composite signal r comprising plural user signals b1,b2, . . . ,bK that have been spread with spreading codes. At first, first hard-decision values bRake are produced on the basis of the rake receiver outputs. Then, first parallel interference cancellation values are produced on the basis of the first hard-decision values, and second hard-decision values bPIC are produced on the basis of the first parallel interference cancellation values. After that, the first and second hard-decision values are combined for producing first combination values, and second parallel interference cancellation values are on the basis of the first combination values. Finally, third hard-decision values are produced on the basis of the second parallel interference cancellation values and the third hard-decision values are output as first stage equalized parallel interference cancellation values bEPIC(1).

32 Claims, 9 Drawing Sheets

U.S. PATENT DOCUMENTS

| | | | |
|---|---|---|---|
| 5,644,592 A | 7/1997 | Divsalar et al. | 375/206 |
| 6,192,067 B1 * | 2/2001 | Toda et al. | 375/144 |
| 6,570,918 B1 * | 5/2003 | Rademacher | 375/232 |
| 6,741,634 B1 * | 5/2004 | Kim et al. | 375/144 |
| 6,816,541 B1 * | 11/2004 | Schmidl | 375/148 |

FOREIGN PATENT DOCUMENTS

| | | |
|---|---|---|
| WO | WO 99/01946 | 1/1999 |
| WO | WO 00/72459 A1 | 11/2000 |
| WO | WO 94/26051 | 11/2004 |

OTHER PUBLICATIONS

T. Ojanpera and R. Prased, "Wideband CDMA for Third Generation Mobile Communications", Artech House Pub., 1998.

S. Verdu, "Minimum probability of error for asynchronous Gaussian multiple-access channels," IEEE Trans. on Inform. Theory, IT-32, pp. 85-96, Jan. 1986.

M.K. Varanasi and B. Aazhang, "Multistage detection for asynchronous code-division multiple-access communications," IEEE Trans. Comm., COM-38 (4) Apr. 1990.

* cited by examiner

Fig. 1

Prior Art

Fig. 2

Prior Art

Fig. 3

Prior Art

EQUALIZED PARALLEL INTERFERENCE CANCELLATION EPIC FOR CDMA SYSTEMS

PRIORITY CLAIM

This is a national stage of application No. PCT/EP00/09825, filed on Oct. 6, 2002. Priority is claimed on that application.

FIELD OF THE INVENTION

In general, the present invention relates to third generation wideband code division multiple access systems (3G WCDMA systems), and in particular, to a method of detecting a spread spectrum composite signal comprising different users' signals that have been spread with signature waveforms.

BACKGROUND OF THE INVENTION

Multiuser communications systems that employ CDMA (Code Division Multiple Access) exhibit a limit on the number of users that can simultaneously communicate over a channel and maintain a specified level of performance per user. This limitation is caused mainly by multiple access interference. In general, solutions to this limitation have employed either optimum multiuser detection or interference cancellation methods.

Optimal multiuser detection (MUD) methods (ref: S. Verdu, "Minimum probability of error for asynchronous Gaussian multiple-access channels," *IEEE Trans. on Inform. Theory*, IT-32, pp. 85–96, January 1986) are able to eliminate the multiple access interference (MAI), but show a complexity that is exponential to the number of users, which seems impossible for practical implementations.

With respect to criteria of complexity and performance, the most appropriate choice of MUD for practical systems has been evaluated in T. Ojanpera and R. Prased, "Wideband CDMA for Third Generation Mobile Communications", Artech House Pub., 1998. It has been found that the implementation of a 3-stage parallel interference cancellation (PIC) provides preferable results.

Figure 1:
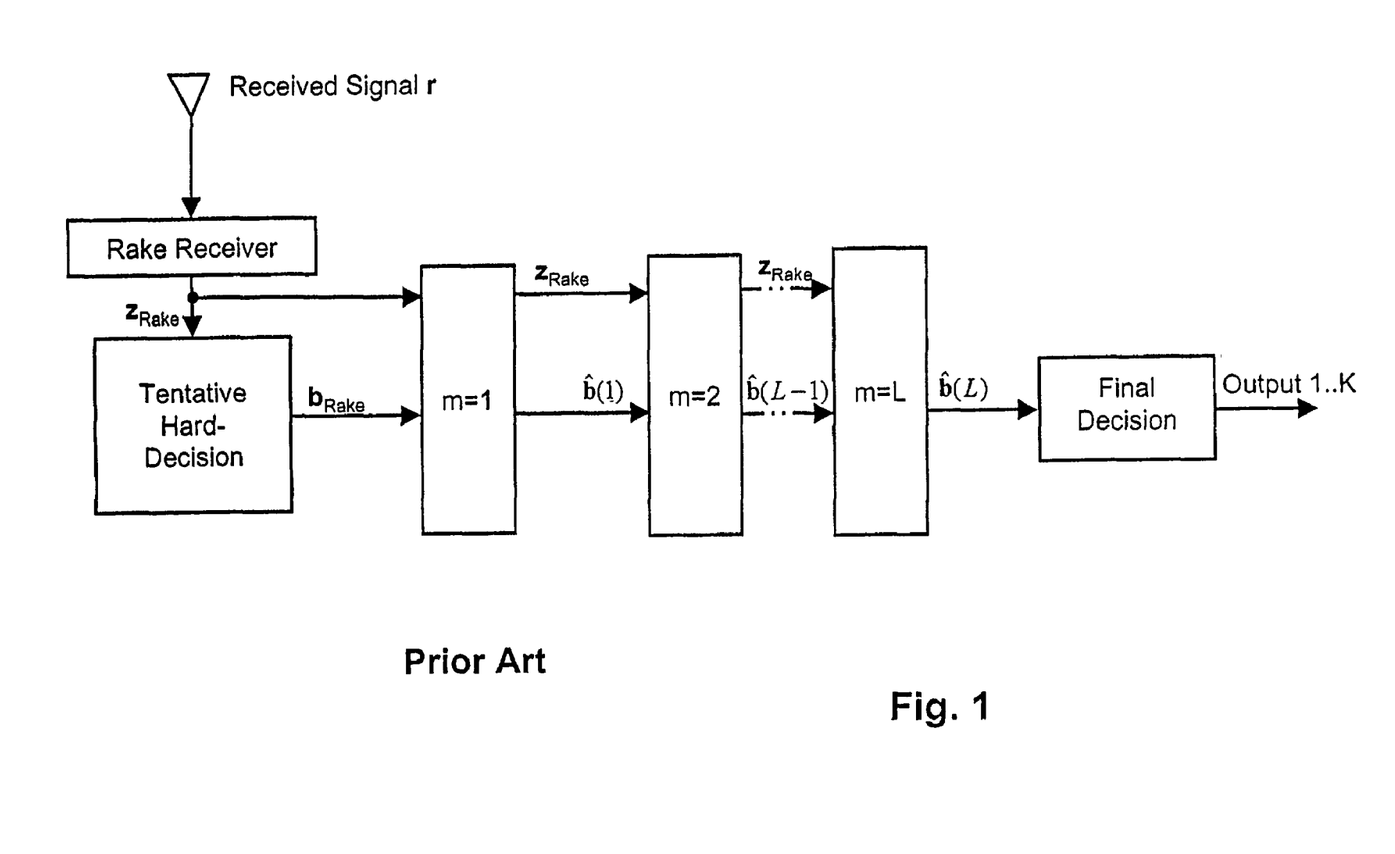
FIG. 1 shows a schematic block diagram of parallel stages of a prior art IC system comprising a rake receiver.

FIG. 1 shows an L-stage parallel interference cancellation approach, with m being the number of each stage. A composite signal comprises a series of coded signals from users 1 through K, each used to modulate an RF carrier using conventional modulation techniques, such as binary phase shift keying (BPSK). The received discrete-time signal r can be written as $$r = SAb + n,$$

wherein:
S=spreading code matrix;
A=channel coefficient matrix;
b=[$b_1, b_2, \ldots, b_K$]=signals transmitted by users 1 through K; and
n=AWGN noise.

For each user k equal to 1 through K, a unique code s(k) is used to spread the signal in the user transmitter, the spreading code matrix S consisting of the codes s(k).

The outputs of the rake receiver $z_{Rake}$:

$$z_{Rake} = A^H S^H r = A^H S^H (SAb+n),$$

wherein:
$( )^H$=conjugate transpose operation; and
$S^H S$=cross-correlations between the spreading codes.

Hence, the rake receiver output consists of a despreaded and matched signal as $z_{Rake}=[z_{1Rake}, z_{2Rake}, \ldots, z_{KRake}]$. For example, the signal $z_{1Rake}$ comprises the signal $b_1$ received from a user 1 plus interference from all other users 2 through K. The signal $z_{Rake}$ may be subjected to a tentative hard-decision concerning the bit polarity so that a signal $\hat{b}_{Rake}=[\hat{b}_{1Rake}, \hat{b}_{2Rake}, \ldots, \hat{b}_{KRake}]$ comprising bit polarities of +1 or −1 for $z_{1Rake}$ through $z_{KRake}$ is the output of the Rake receiver. The signals $\hat{b}_{Rake}$ and $z_{Rake}$ are used as inputs into a first parallel cancellation stage m=1. Each parallel cancellation stage requires only one bit time causing each stage to be delayed by the product of the number of previous stages and the one bit time interval. The output $\hat{b}(L)$ of the final stage L is estimated by a final decision device such as a hard decision device.

Figure 2:
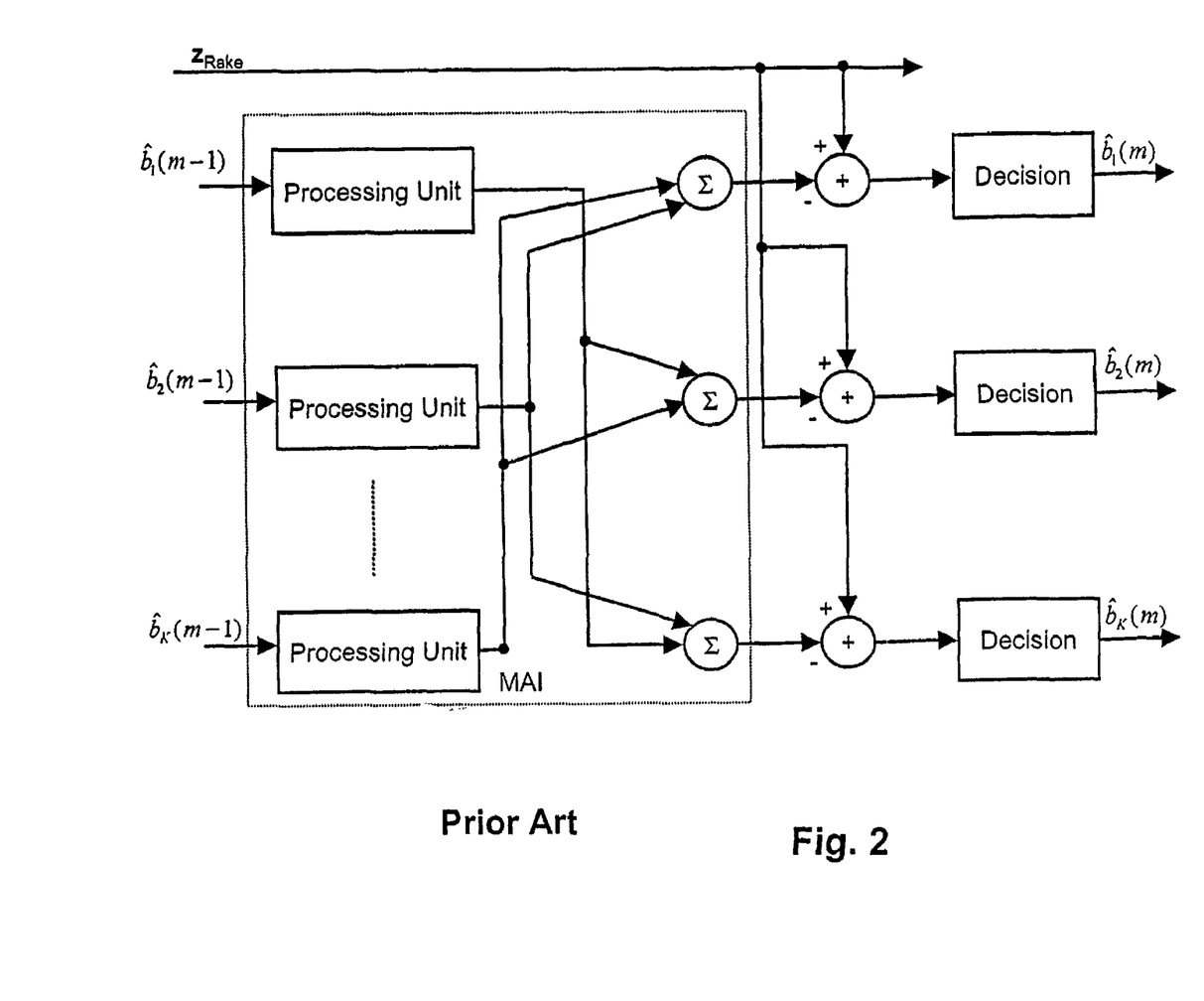
FIG. 2 shows a schematic block diagram of a stage of a conventional PIC detector.

FIG. 2 shows an mth stage conventional PIC detector for BPSK (Binary Phase Shift Keying) modulation proposed by M. K. Varanasi and B. Aazhang, "Multistage detection for asynchronous code-division multiple-access communications," IEEE Trans.Comm., COM-38(4), April 1990. The estimated signal $\hat{b}(m)$ at stage m is calculated according to the following equation:

$$\hat{b}(m)=sgn[z_{Rake}-MAI_{m-1}]=sgn[z_{Rake}-F\hat{b}(m-1)], \quad m=1\ldots L \tag{1}$$

wherein:
$\hat{b}(0)=\hat{b}_{Rake}=sgn[z_{Rake}(0)]$; and
$F=A^H S^H SA-\text{diag}([A^H S^H SA]_{ii})$ off-diagonal cross-correlation matrix.

The MAI can be calculated by the processing units and the summing points shown in FIG. 2. For example, MAI for user 1 is calculated by the processed and summed signals from users 2 to K and then is subtracted from $z_{Rake}$. The subtraction result is subjected to a hard decision. The output of the $L^{th}$-stage $\hat{b}(L)$ may be subjected to a final decision in order to obtain an output signal $b_{PIC}$.

Figure 3:
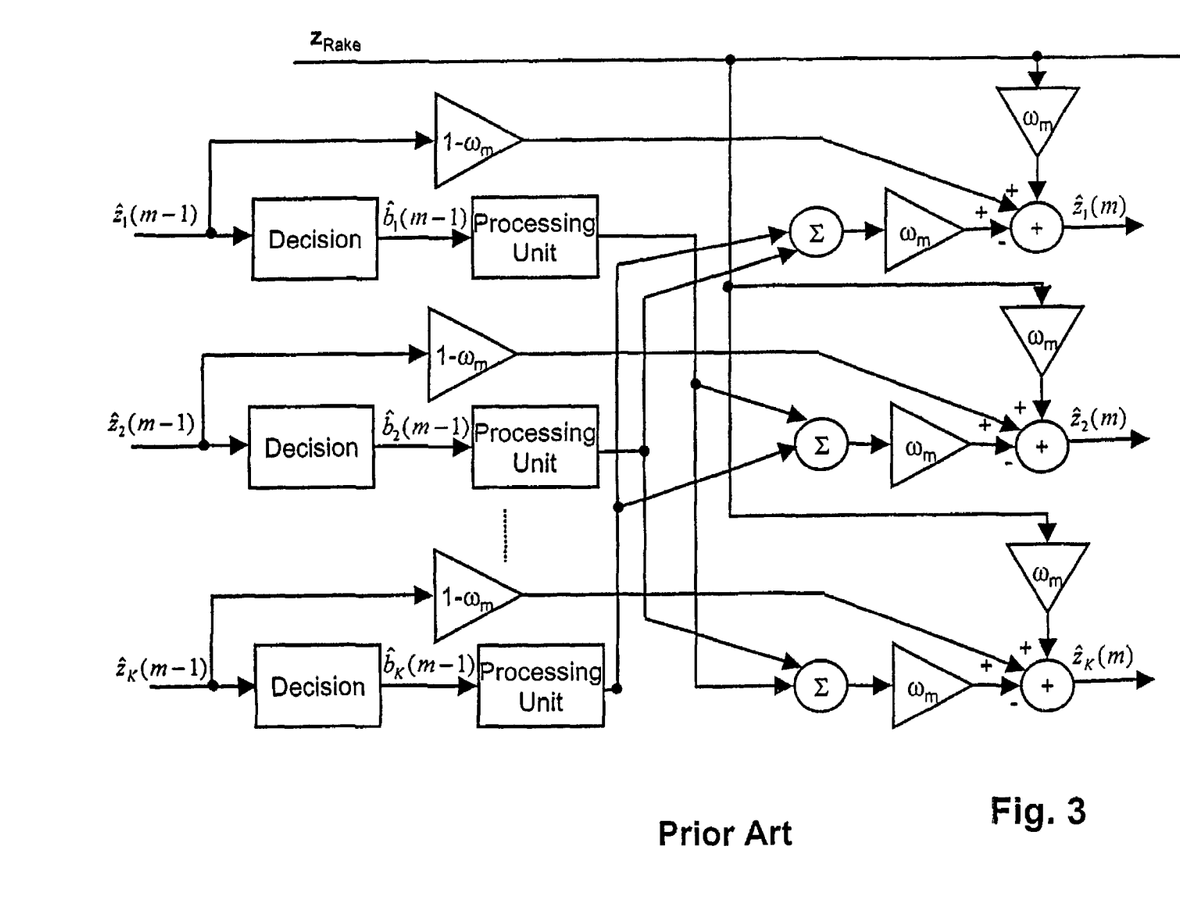
FIG. 3 shows a schematic block diagram of a stage of a conventional PPIC detector.

FIG. 3 shows an mth stage PPIC (Partial Parallel Interference Cancellation) detector disclosed in the U.S. Pat. No. 5,644,592 assigned to Divsalar et al. The estimated signal $\hat{z}(m)$ at stage m is calculated in accordance with the following equation:

$$\hat{z}(m)=\omega_m[z_{Rake}-F\hat{b}(m-1)]+(1-\omega_m)\hat{z}(m-1), \quad m=1\ldots L \tag{2}$$

wherein:
$\hat{b}(m)=sgn[\hat{z}(m)]$; and
$\hat{z}(0)=z_{Rake}$.

As it is shown in FIG. 3, soft-outputs of data estimates $\hat{z}(m-1)$ are weighted by $1-\omega_m$ and then added with the soft signal $z_{Rake}$ with cancellation of MAI regenerated by latest estimates. The data estimates at the $m^{th}$ stage can be obtained from this added signal $\hat{z}(m)$. In a final decision device, the data estimates $\hat{z}(L)$ may be subjected to a hard-decision so that a hard-decision signal $b_{PPIC}$ is output.

SUMMARY OF THE INVENTION

It is an object of the present invention to improve the system performance in suboptimal MUD with negligible increase of complexity.

According to a first aspect of the present invention, this object is achieved by a method of detecting a spread spectrum composite signal (r) comprising plural user signals ($b_1, b_2, \ldots, b_K$) that have been spread with spreading codes, said method comprising the steps of:

a) receiving the composite signal (r) at a rake receiver;
b) obtaining a rake receiver output $z_{Rake}=A^H S^H r$;

c) producing first hard-decision values $b_{Rake}=\text{sgn}(z_{Rake})$ on the basis of the rake receiver output $z_{Rake}$;

d) producing first parallel interference cancellation values $z_{Rake}-Fb_{Rake}$ on the basis of $b_{Rake}$;

e) producing second hard-decision values $b_{PIC}=\text{sgn}(z_{Rake}-Fb_{Rake})$ on the basis of the first parallel interference cancellation values;

f) producing first combination values $\breve{b}$ by combining the hard-decision values $b_{Rake}$ and $b_{PIC}$;

g) producing second parallel interference cancellation values $z_{Rake}-F\breve{b}$ on the basis of the first combination values $\breve{b}$; and h) producing third hard-decision values $\breve{b}_{EPIC}(1)=\text{sgn}(z_{Rake}-F\breve{b})$ on the basis of the second parallel interference cancellation values, $\breve{b}_{EPIC}(1)$ being considered to be the output of the equalized parallel interference cancellation (EPIC) detector at a first stage.

According to a second aspect, the above mentioned object is achieved by a detecting device for detecting a spread spectrum composite signal (r) comprising plural user signals $(b_1, b_2, \ldots, b_k)$ that have been spread with spreading codes, the composite signal (r) being received at a rake receiver which provides a rake receiver output $z_{Rake}=A^H S^H r$, said detecting device being arranged to:

a) produce first hard-decision values $b_{rake}=\text{sgn}(z_{Rake})$ on the basis of the rake receiver output $z_{Rake}$;

b) produce first parallel interference cancellation values $z_{Rake}-Fb_{Rake}$ on the basis of $b_{Rake}$;

c) produce second hard-decision values $b_{PIC}=\text{sgn}(z_{Rake}-Fb_{Rake})$ on the basis of the first parallel interference cancellation values;

d) produce first combination values $\breve{b}$ by combining the hard-decision values $b_{Rake}$ and $b_{PIC}$;

e) produce second parallel interference cancellation values $z_{Rake}-F\breve{b}$ on the basis of the first combination values $\breve{b}$; and f) produce third hard-decision values $\breve{b}_{EPIC}(1)=\text{sgn}(z_{Rake}-F\breve{b})$ on the basis of the second parallel interference cancellation values, $\breve{b}_{EPIC}(1)$ being considered to be the output of the equalized parallel interference cancellation (EPIC) detector at a first stage.

The hard-decision values $b_{EPIC}(m)$ $(m=2,3,\ldots,L)$ at $m^{th}$ stage may be combined with the hard-decision values of equalized parallel interference cancellation values $b_{EPIC}(m-1)$ at $(m-1)^{th}$ stage for producing $m^{th}$ combination values $\breve{b}(m)$. $(m+1)^{th}$ parallel interference cancellation values then are produced on the basis of the $m^{th}$ combination values $\breve{b}(m)$, and hard-decision values $b_{EPIC}(m+1)$ at $(m+1)^{th}$ stage are produced on the basis of the $(m+1)^{th}$ parallel interference cancellation values. These steps may be repeated a predetermined number of times or until a predetermined bit-error-rate is reached.

According to a first embodiment of the present invention, the first combination values may be produced by summing the first and second hard-decision values which are weighted by $(1-\omega_1)$ and $\omega_1$, respectively.

According to a second embodiment of the present invention, for $k^{th}$ user, in case the first hard-decision value equals the second hard-decision value, the second hard-decision value is used as the first combination value, and in case the first hard-decision value does not equal the second hard-decision value, the first combination value for the $k^{th}$ user is produced by weighting the second hard-decision value with $(2\omega_1-1)$.

According to the first embodiment, the $m^{th}$ combination values may be produced by summing the $(m)^{th}$ and $(m+1)^{th}$ hard-decision values which are weighted by $(1-\omega_m)$ and $\omega_m$, respectively.

According to the second embodiment, the $m^{th}$ hard-decision values and the $(m-1)^{th}$ hard-decision values of EPIC detector are compared for each user, wherein, for user k, in case the $m^{th}$ hard-decision value equals the $(m-1)^{th}$ hard-decision value, the $m^{th}$ hard-decision value is used as the $m^{th}$ combination value, and wherein in case the $m^{th}$ hard-decision value does not equal the $(m-1)^{th}$ hard-decision value, the $m^{th}$ combination value is produced by weighting the $m^{th}$ hard-decision value with $(2\omega_m-1)$.

The $m^{th}$ weighting factor may be larger than a $(m-1)^{th}$ weighting factor.

According to the present invention, the first parallel interference cancellation values may be produced by regenerating the induced multiple access interference (MAI) in accordance with:

$$MAI_1 = Fb_{Rake}$$

$$F = A^H S^H SA - \text{diag}([A^H S^H SA]_{ii})$$

wherein:
S=spreading code matrix;
A=channel coefficient matrix;
$(\ )^H$=conjugate transpose operation; and
F=off-diagonal cross-correlation matrix.

According to the second embodiment, the second parallel interference cancellation values are produced by regenerating the induced multiple access interference (MAI) in accordance with:

$$\begin{aligned} MAI_2 &= F[\omega_1 b_{PIC} + (1-\omega_1) b_{Rake})] \\ &= F[(2\omega_1 - 1)b_{PIC}] && \text{if } [b_{Rake}]_k \neq [b_{PIC}]_k \\ &= Fb_{PIC} && \text{if } [b_{Rake}]_k = [b_{PIC}]_k * \end{aligned}$$

$$F = A^H S^H SA - \text{diag}([A^H S^H SA]_{ii})$$

wherein:
S=spreading code matrix;
A=channel coefficient matrix;
$(\ )^H$=conjugate transpose operation; and
F=off-diagonal cross-correlation matrix.

Moreover, according to the second embodiment, the $(m+1)^{th}$ parallel interference cancellation values are produced by regenerating the induced-multiple access interference (MAI) in accordance with:

$$\begin{aligned} MAI_{m+1} &= F[2\omega_m - 1)b_{EPIC}(m-1)] && \text{if } [b_{Rake}]_k \neq [b_{PIC}]_k \\ &= Fb_{EPIC}(m-1) && \text{if } [b_{Rake}]_k = [b_{PIC}]_k * \end{aligned}$$

$$F = A^H S^H SA - \text{diag}([A^H S^H SA]_{ii})$$

wherein:
S=spreading code matrix;
A=channel coefficient matrix;
$(\ )^H$=conjugate transpose operation; and
F=off-diagonal cross-correlation matrix.

The weights or weighting factors at each stage m may be varied and predefined in different systems by trail-and-error simulations on training sequences. Furthermore, the weights may be optimized by adaptive schemes.

Moreover, the weights or weighting factors can be defined by power of 2, which further reduces the implementation complexity of the present invention significantly.

The detecting device according to the second aspect may be implemented in an apparatus such as a base station or terminal comprising a rake receiver.

The present invention provides a significantly improved system performance compared to conventional PIC detectors with nearly the same complexity. Moreover, the EPIC (Equalized Parallel Interference Cancellation) detection according to the present invention significantly outperforms PPIC detectors in heavily loaded systems.

According to the present invention, an extra K bit memory for storing hard-decisions of a previous stage is required, where K is the number of users. For example, if K=31, an extra memory with the capacity of 31 bits or 4 bytes is required. However, the conventional PPIC detector requires more memory capacity for storing soft-decisions of a previous stage. For example, if 8 bits are used for each soft-decision and K=31, 31×8 bits or 31 bytes of memory capacity are required for the PPIC detector.

The EPIC detector according to the present invention requires MK times digital two-bit-comparisons where M is number of stages and the two-bit comparator can be installed by only four logical gates. The EPIC detector also requires approximately extra MK/4 multiplications (floating_point× weight×±1) because there is no need for extra multiplications if hard-decisions of two successive stages are the same. However, the extra multiplications require 5MK/2 operations if 8 bits are used for floating points and 4 bits are used for weight. Furthermore, if the weights could be defined by power of 2, only 2 bits might be needed for weight. Then the extra multiplications only require 3MK/4 operations and the complexity can be further reduced significantly.

In contrast thereto, the conventional PPIC detector requires 2MK extra multiplications (floating_point×weight× floating_point). This means, extra 64MK operations are required.

It can be noticed that the present invention only requires extra operations negligible compared to the conventional PIC detector. Moreover, the complexity can be considerably reduced by the present invention compared to the PPIC detector.

The present invention can easily be implemented in 3G products like 3G FDD/TDD-WCDMA base stations or 3G TDD-WCDMA terminals, providing significant improvement of system performance.

In the following the present invention will be described by way of preferred embodiments thereof with reference to the accompanying drawings.

DESCRIPTION OF THE PREFERRED EMBODIMENTS

The idea of the present invention is to combine and equalize hard-decision-outputs of a rake receiver and a 1-stage parallel interference cancellation (PIC) detector in order to achieve a more reliable data estimation.

Figure 4:
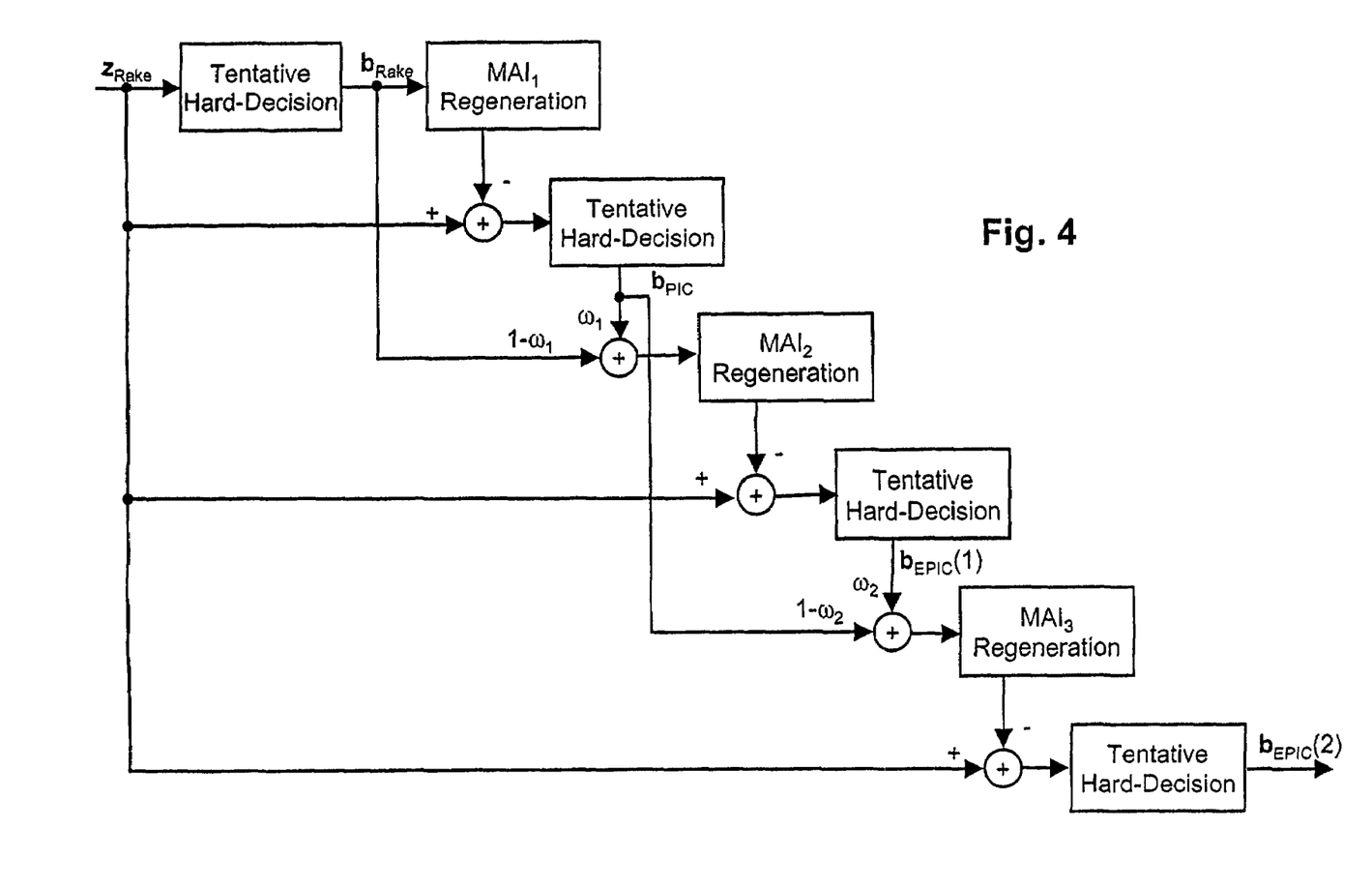
FIG. 4 shows a schematic block diagram of a 2-stage EPIC detector according to a first embodiment of the present invention.

According to FIG. 4 showing a block diagram of the present invention and a weighting scheme according to the first embodiment, the signal $z_{Rake}$ output from the rake receiver is subjected to a tentative hard-decision to obtain hard-decision values $b_{Rake}$ in accordance with:

$[b_{Rake}]_k = sgn\{[z_{Rake}]_k\}$, with k=1,2, . . . ,K, k being the user index.

The hard-decision values $b_{Rake}$ are subjected to an MAI regeneration which consists of a parallel interference cancellation in accordance with:

$MAI_1 = Fb_{Rake}$, $F = A^H S^H SA - diag([A^H S^H SA]_{ii})$ off-diagonal cross-correlation matrix.

The values output by the first MAI regeneration shown in FIG. 4 are subtracted from the rake receiver signal $z_{Rake}$, and the result is subjected to a tentative hard-decision. The signal $b_{PIC}$ output by the tentative hard-decision is determined as follows:

$$b_{PIC} = sgn[z_{Rake} - Fb_{Rake}].$$

If $[b_{Rake}]_k = [b_{PIC}]_k$, these decisions are regarded as highly reliable, and the induced multiple access interference (MAI) is regenerated and fully subtracted from the soft rake receiver outputs $z_{Rake}$. If $[b_{Rake}]_k \neq [b_{PIC}]_k$, the MAI induced by low-reliability decisions are weighted and fractionally subtracted from $z_{Rake}$. That is, the second MAI regeneration shown in FIG. 4 is calculated as follows:

$$MAI_2 = F[\omega_1 b_{PIC} + (1-\omega_1) b_{Rake}]$$

The output signal of the second MAI regeneration is subtracted from $z_{Rake}$. The subtraction result is subjected to a tentative hard-decision and a first-stage equalized parallel interference cancellation output $b_{EPIC}(1)$ is obtained as follows:

$$b_{EPIC}(1) = sgn\{z_{Rake} - F[\omega_1 b_{PIC} + (1-\omega_1) b_{Rake}]\}.$$

At the second stage, the hard-decisions $b_{PIC}$ of the 1-stage PIC and the first-stage EPIC detector output $b_{EPIC}(1)$ are equalized. Subsequently, at the third stage, the hard-decisions $b_{EPIC}(1)$ and $b_{EPIC}(2)$ of the first stage and second stage EPIC are equalized, etc., in accordance with the following equation:

$$b_{EPIC}(m)=sgn\{z_{Rake}-F[\omega_m b_{EPIC}(m-1)+(1-\omega_m)b_{EPIC}(m-2)]\},$$

with m=2, 3, . . . , L; and
$b_{EPIC}(0)=b_{PIC}$.

A more general equation covering the first to $L^{th}$ stage of the EPIC detector according to the present invention is as follows:

$$\tilde{b}(m)=sgn\{z_{Rake}-F[\omega_m \tilde{b}(m-1)+(1-\omega_m)\tilde{b}(m-2)]\} \quad (3)$$

wherein:
m=2, 3, . . . , L;
$\tilde{b}(0)=b_{Rake}$;
$\tilde{b}(1)=b_{PIC}$.

The EPIC process will be repeated until a predefined number of stages has been completed which relates to the convergence rate or the target bit-error-rate (BER).

Figure 5:
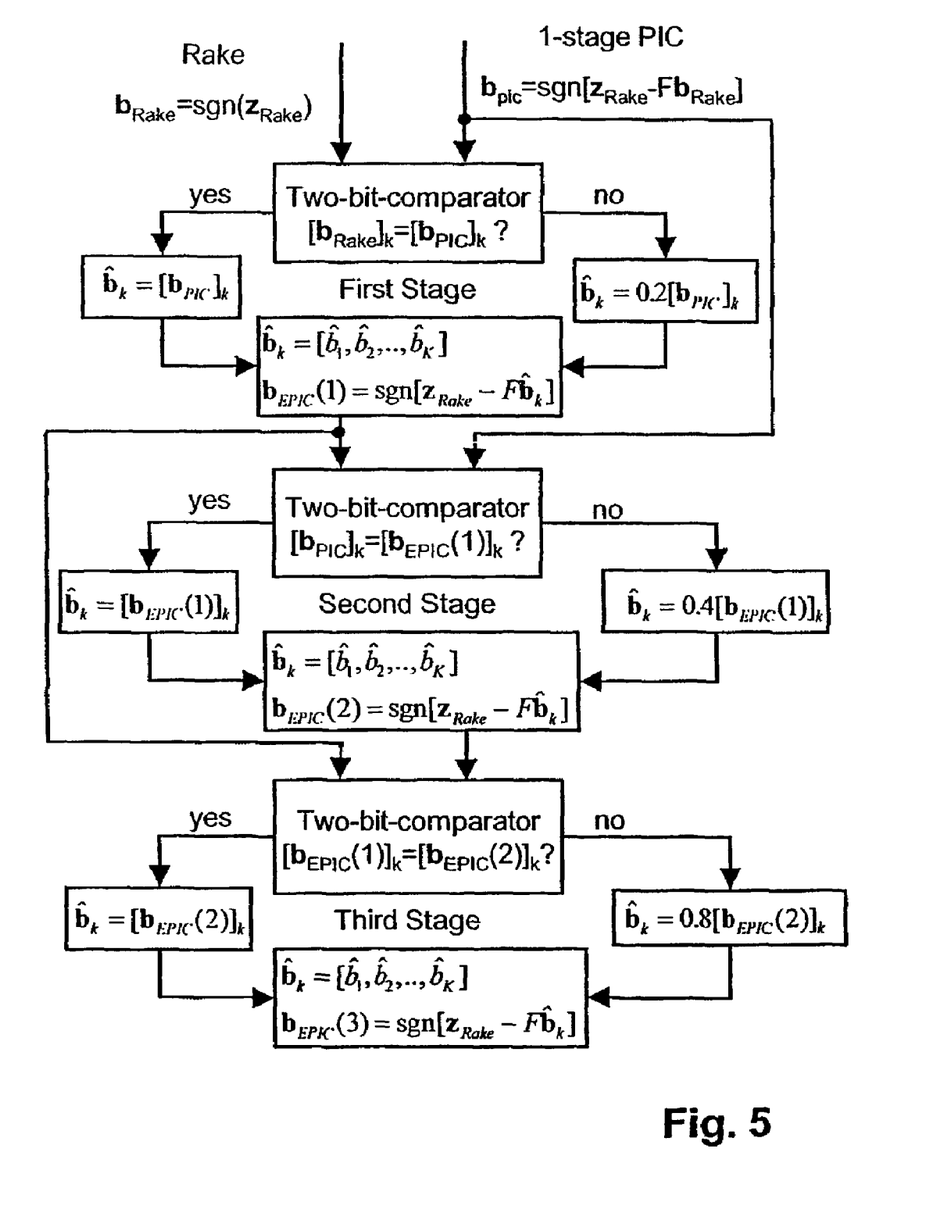
FIG. 5 shows a flow-chart of the operation of a 3-stage EPIC detector according to a second embodiment of the present invention.

FIG. 5 shows a flow-chart according to a second embodiment of the EPIC detector of the present invention. According to the second and preferred embodiment, the EPIC detector comprises three stages, and the weighting factors of stages 1 to 3 are chosen to $\omega_m=[0.6;0.7;0.9]$. $b_{EPIC}(m)$ (m=1,2,3) is calculated according to the following equation:

$$b_{EPIC}(m)=sgn[z_{Rake}-F\tilde{b}_k].$$

At the first stage, the hard-decision outputs $b_{Rake}$ of the rake receiver are compared with the outputs $b_{PIC}$ of the 1-stage PIC detector by a two-bit-comparator, which consists of only 4 logical gates, for each user. If the two signals are equal, $\tilde{b}_k$ is set to $[b_{PIC}]_k$. If not, $\tilde{b}_k$ is set to $0.2[b_{PIC}]_k$. The value $0.2=(2\omega_1-1)$ is obtained from the weight $\omega_1=0.6$ and from the fact that $[b_{Rake}]_k=-[b_{PIC}]_k$, wherein $\tilde{b}_k=\omega_1 b_{PIC}+(1-\omega_1)b_{Rake}$.

At the second stage, the hard-decision outputs $b_{EPIC}(1)$ and $b_{PIC}$ are compared by a two-bit-comparator for each user. If the two signals are equal, $\tilde{b}_k$ is set to $[b_{EPIC}(1)]_k$. If not, $\tilde{b}_k$ is set to $0.4[b_{EPIC}(1)]_k$. The value $0.4=(2\omega_2-1)$ is obtained from the weight $\omega_2=0.7$ and from the fact that $b_{PIC}=-b_{EPIC}(1)$, wherein $\tilde{b}_k=\omega_2 b_{EPIC}(1)+(1-\omega_2)b_{PIC}$.

At the third stage, the hard-decision outputs $b_{EPIC}(1)$ and $b_{EPIC}(2)$ are compared by a two-bit-comparator for each user. If the two signals are equal, $\tilde{b}_k$ is set to $[b_{EPIC}(2)]_k$. If not, $\tilde{b}$ is set to $0.8[b_{EPIC}(2)]_k$. The value $0.8=(2\omega_3-1)$ is obtained from the weight $\omega_3=0.9$ and from that fact that $b_{EPIC}(2)=-b_{EPIC}(1)$, wherein $\tilde{b}_k=\omega_3 b_{EPIC}(2)+(1-\omega_3)b_{EPIC}(1)$.

The determination of $\tilde{b}_k$ can also be made in accordance with:

$$\tilde{b}_k=(2\omega_m-1)[b_{EPIC}(m-1)]_k \text{ if } [b_{EPIC}(m-1)]_k \neq [b_{EPIC}(m-1)]_k=[b_{EPIC}(m-1)]_k \text{ if } [b_{EPIC}(m-1)]_k=[b_{EPIC}(m-2)]_k$$

The weighting factors $\omega_m=[0.6;0.7;0.9]$ with the only restriction $0.5<\omega1<\omega2<\omega3$ have been tested in simulations, as it is assumed that higher EPIC stages provide more reliable data estimates. The weights at each stage could be varied and predefined in different systems by trial-and-error simulations on training sequences. Furthermore, the weights could be optimized by adaptive schemes.

FIGS. 6 to 9 show simulation results of bit-error-rates (BER) as a function of the signal to noise ratio, the bit error rates being obtained by a rake receiver alone, a conventional 3-stage PIC detector, a conventional 3-stage PPIC detector with $\omega_m=[0.5;0.7;0.9]$ and the EPIC detector according to the preferred embodiment of the present invention.

Figure 6:
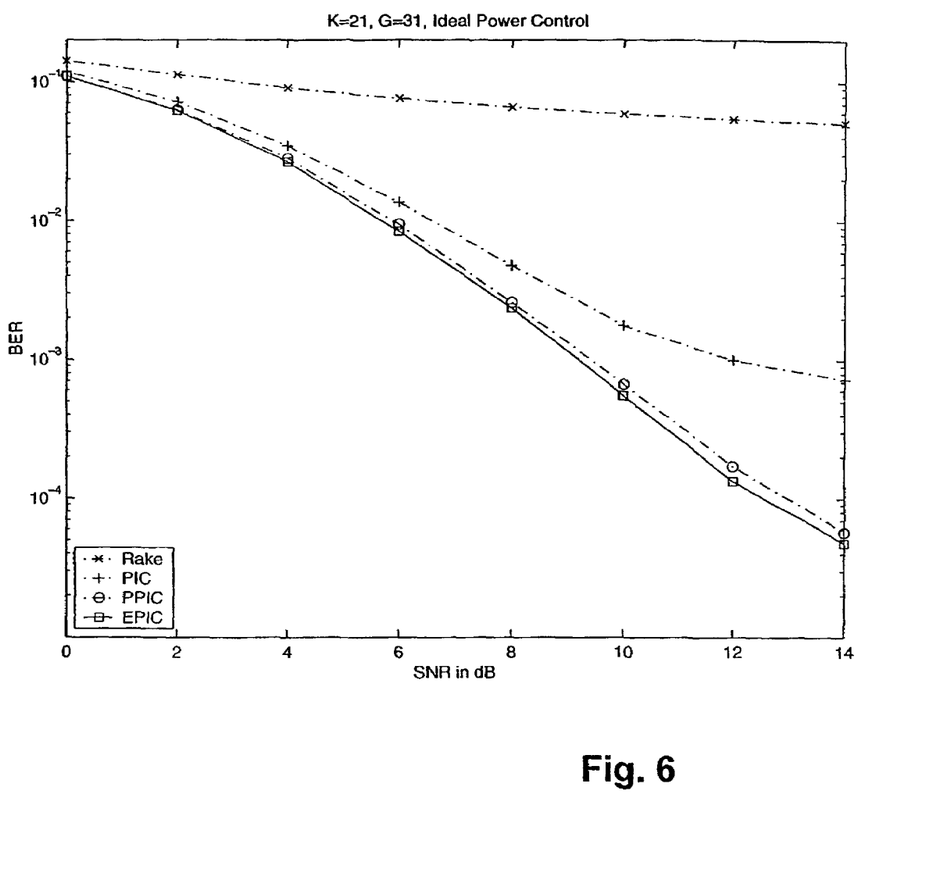
FIG. 6 shows a graph of the bit error rate BER of a rake receiver alone, a rake receiver with a PIC detector, a rake receiver with a PPIC detector and a rake receiver with an EPIC detector according to the second embodiment of the present invention, as a function of the signal-to-noise ratio in a system with 21 users, a 31-bit Gold code and ideal power control.

FIG. 6 shows the respective bit-error-rates for the uplink direction and a perfect channel estimation, the number of paths being equal to one, in case of 21 users with ideal power control and a 31-bit Gold code as spreading code.

Figure 7:
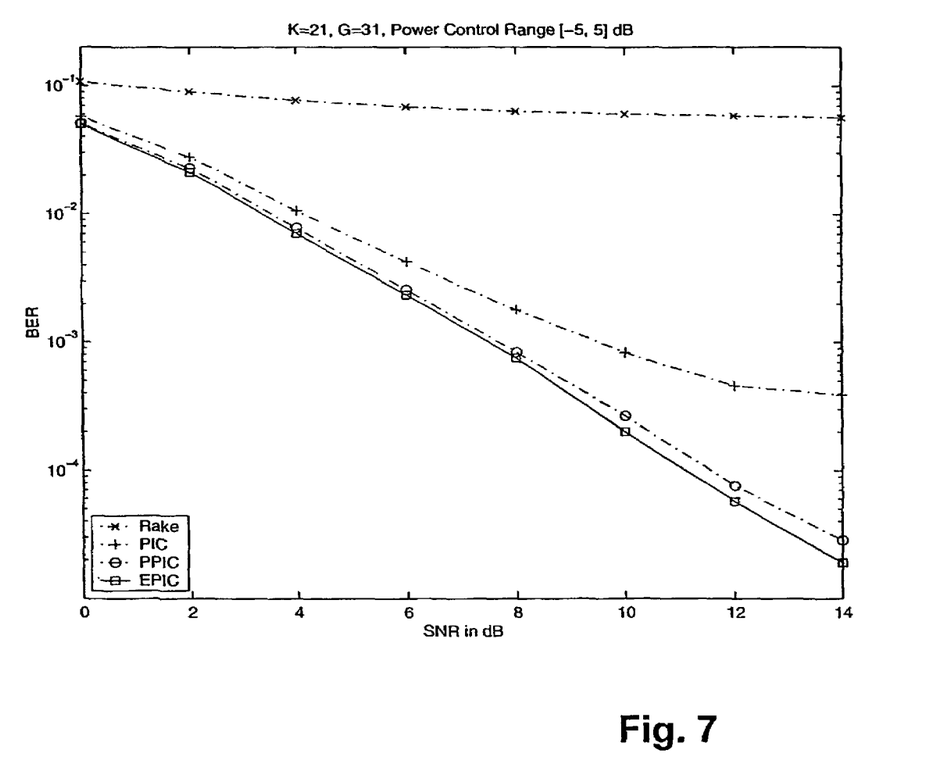
FIG. 7 shows a graph of the bit error rate BER of a rake receiver alone, a rake receiver with a PIC detector, a rake receiver with a PPIC detector and a rake receiver with an EPIC detector according to the second embodiment of the present invention, as a function of the signal-to-noise ratio in a system with 21 users, a 31-bit Gold code and a power control in the range of [−5, +5]dB.

FIG. 7 shows the respective bit-error-rates for the uplink direction and a perfect channel estimation, the number of paths being equal to one, in case of 21 users with a power control in the range of [−5,+5]dB and a 31-bit Gold code as spreading code.

Figure 8:
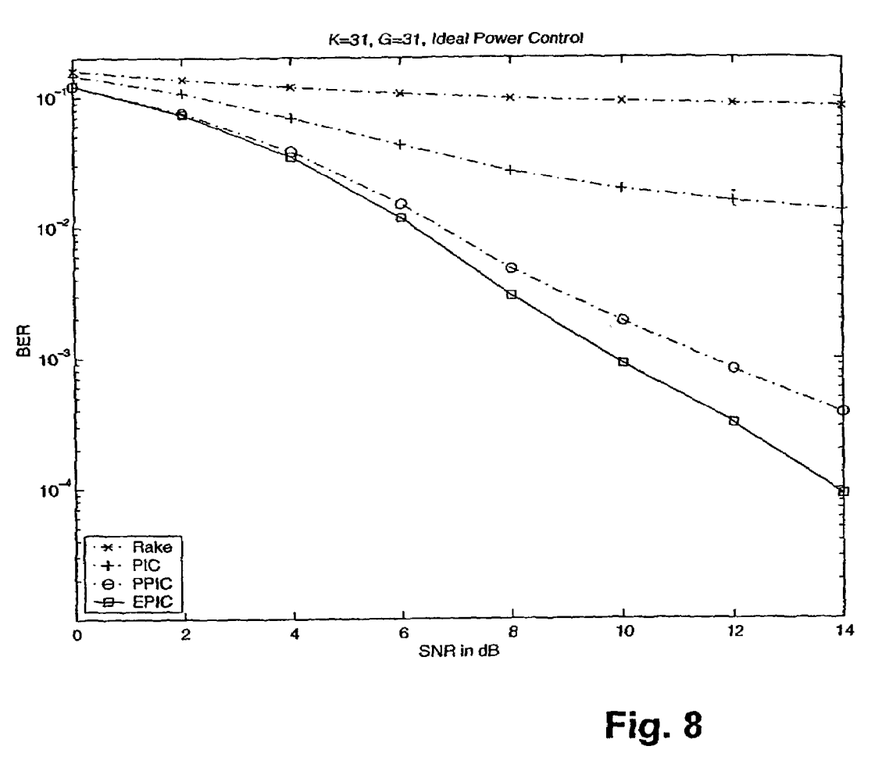
FIG. 8 shows a graph of the bit error rate BER of a rake receiver alone, a rake receiver with a PIC detector, a rake receiver with a PPIC detector and a rake receiver with an EPIC detector according to the second embodiment of the present invention, as a function of the signal-to-noise ratio in a system with 31 users, a 31-bit Gold code and ideal power control.

FIG. 8 shows the respective bit-error-rates for the uplink direction and a perfect channel estimation, the number of paths being equal to one, in case of 31 users with ideal power control and a 31-bit Gold code as spreading code.

Figure 9:
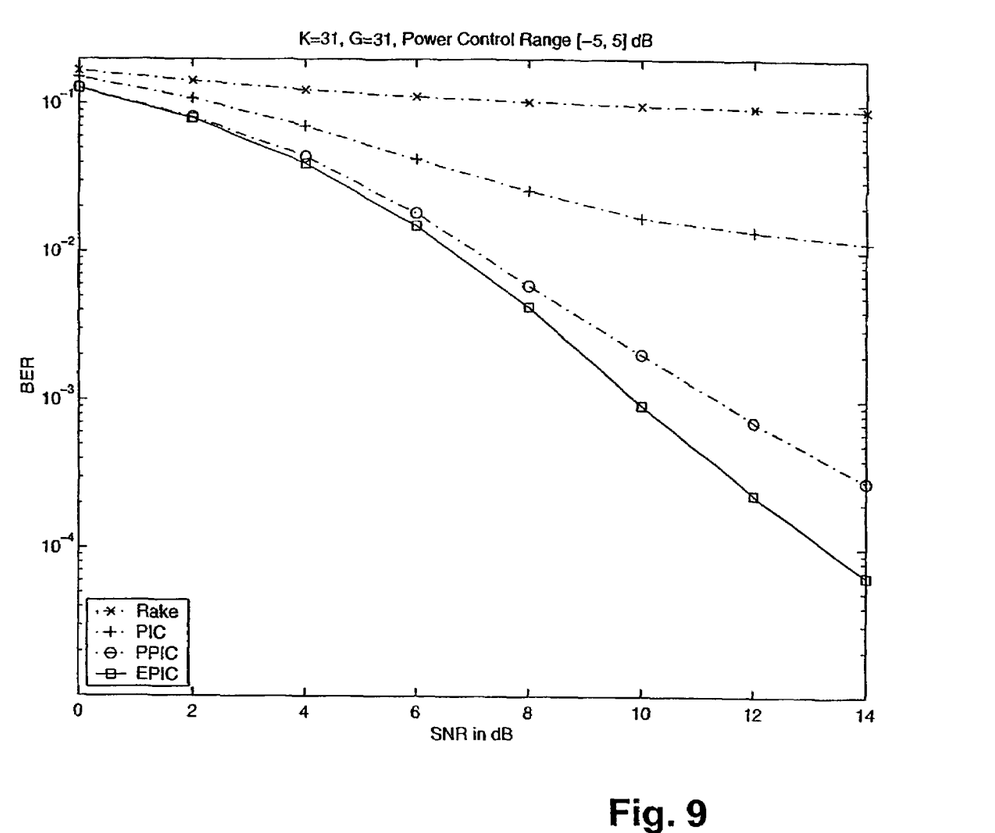
FIG. 9 shows a graph of the bit error rate BER of a rake receiver alone, a rake receiver with a PIC detector, a rake receiver with a PPIC detector and a rake receiver with an EPIC detector according to the second embodiment of the present invention, as a function of the signal-to-noise ratio in a system with 31 users, a 31-bit Gold code and a power control in the range of [−5, +5]dB.

FIG. 9 shows the respective bit-error-rates for the uplink direction and a perfect channel estimation, the number of paths being equal to one, in case of 31 users with a power control in the range of [−5,+5]dB and a 31-bit Gold code as spreading code.

As can be seen from FIGS. 6 to 9, the EPIC detector according to the preferred embodiment significantly outperforms the conventional PIC and PPIC detectors. With the EPIC detector according to the present invention, the system performance can be considerably improved especially in heavily loaded systems.

While the invention has been described with reference to a preferred embodiment, the description is illustrative of the invention and is not to be construed as limiting the invention. Various modifications and applications may occur to those skilled in the art without departing from the true spirit and scope of the invention as defined by the appended claims.

What is claimed is:

1. A method of detecting a spread spectrum composite signal (r) comprising plural user signals ($b_1,b_2, \ldots ,b_K$) that have been spread with spreading codes to minimize multiple access interference, comprising:
   a) receiving the composite signal (r) at a rake receiver;
   b) obtaining a rake receiver output $z_{Rake}=A^H S^H r$;
   c) producing first hard-decision values $b_{Rake}=sgn(z_{Rake})$ based on the rake receiver output $z_{Rake}$;
   d) producing first parallel interference cancellation values $z_{Rake}-Fb_{Rake}$ based on $b_{Rake}$;
   e) producing second hard-decision values $b_{PIC}=sgn(z_{Rake}-Fb_{Rake})$ based on the first parallel interference cancellation values;
   f) producing first combination values $\tilde{b}$ by combining the hard-decision values $b_{Rake}$ and $b_{PIC}$;
   g) producing second parallel interference cancellation values $z_{Rake}-F\tilde{b}$ based on the first combination values $\tilde{b}$; and
   h) producing third hard-decision values $\tilde{b}_{EPIC}(1)=sgn(z_{Rake}-F\tilde{b})$ based on the second parallel interference cancellation values such that multiple access interference is minimized, said $\tilde{b}_{EPIC}(1)$ being an output of an equalized parallel interference cancellation (EPIC) detector at a first stage;
   wherein:
   S=spreading code matrix;
   A=channel coefficient matrix;
   $()^H$=conjugate transpose operation; and
   F=off-diagonal cross-correlation matrix.

2. The method according to claim 1, further comprising:

i) combining hard-decision values $b_{EPIC}(m)$ (m=2, 3, . . . ,L) at $m^{th}$ stage with hard-decision values of equalized parallel interference cancellation values $b_{EPIC}(m-1)$ at $(m-1)^{th}$ stage for producing $m^{th}$ combination values $\tilde{b}(m)$;

j) producing $(m+1)^{th}$ parallel interference cancellation values based on the $m^{th}$ combination values $\tilde{b}(m)$; and k) producing hard-decision values $b_{EPIC}(m+1)$ at $(m+1)^{th}$ stage based on the $(m+1)^{th}$ parallel interference cancellation values.

3. The method of claim 2, wherein the steps i) to k) are repeated a predetermined number of times.

4. The method of claim 2, wherein the steps i) to k) are repeated until a predetermined bit-error-rate is reached.

5. The method of claim 1, wherein the first combination values are produced by summing the first and second hard-decision values which are weighted by $(1-\omega_1)$ and $\omega_1$, respectively;

wherein $\omega_1$ is a weighting factor.

6. The method of claim 1, wherein, for $k^{th}$ user, in case the first hard-decision value equals the second hard-decision value, the second hard-decision value is used as the first combination value, and wherein in case the first hard-decision value does not equal the second hard-decision value, the first combination value for the $k^{th}$ user is produced by weighting the second hard-decision value with $(2\omega_1-1)$;

wherein $\omega_1$ is a weighting factor.

7. The method of claim 2, wherein step i) comprises the steps of:

producing the $m^{th}$ combination values by summing the $(m)^{th}$ and $(m+1)^{th}$ hard-decision values which are weighted by $(1-\omega_m)$ and $\omega_m$, respectively;

wherein $\omega_m$ is a weighting factor.

8. The method of claim 2, wherein step i) comprises:

comparing the $m^{th}$ hard-decision values and the $(m-1)^{th}$ hard-decision values of the EPIC detector for each user, wherein, for user k, in case the $m^{th}$ hard-decision value equals the $(m-1)^{th}$ hard-decision value, the $m^{th}$ hard-decision value is used as the $m^{th}$ combination value, wherein in case the $m^{th}$ hard-decision value does not equal the $(m-1)^{th}$ hard-decision value, the $m^{th}$ combination value is produced by weighting the $m^{th}$ hard-decision value with $(2\omega_m-1)$, and wherein $\omega_m$ is a weighting factor.

9. The method of claim 7, wherein the $m^{th}$ weighting factor is larger than a $(m-1)^{th}$ weighting factor.

10. The method of claim 1, wherein the first parallel interference cancellation values are produced by regenerating the induced multiple access interference (MAI) in accordance with:

$$MAI_1 = Fb_{Rake}$$

$$F = A^H S^H SA - \text{diag}([A^H S^H SA]).$$

11. The method of claim 6, wherein the second parallel interference cancellation values are produced by regenerating the induced multiple access interference (MAI) in accordance with:

$$MAI_2 = F[\omega_1 b_{PIC} + (1-\omega_1)b_{Rake}]$$
$$= F[(2\omega_1-1)b_{PIC}] \quad \text{if } [b_{Rake}]_k \neq [b_{PIC}]_k$$
$$= Fb_{PIC} \quad \text{if } [b_{Rake}]_k = [b_{PIC}]_k *$$

12. The method of claim 8, wherein the $(M+1)^{th}$ parallel interference cancellation values are produced by regenerating the induced multiple access interference (MAI) in accordance with:

$$MAI_{m+1} = F[2\omega_m - 1)b_{EPIC}(m-1)] \quad \text{if } [b_{Rake}]_k \neq [b_{PIC}]_k$$
$$= Fb_{EPIC}(m-1) \quad \text{if } [b_{Rake}]_k = [b_{PIC}]_k *$$
$$F = A^H S^H SA - \text{diag}([A^H S^H SA]_{ii}).$$

13. The method of claim 5, wherein the weighting factors at each stage m are varied and predefined in different systems by trial-and-error simulations on training sequences and optimized by adaptive schemes.

14. The method of claim 5, wherein the weighting factors are defined by a power of 2.

15. An apparatus for detecting a spread spectrum composite signal (r) comprising plural user signals ($b_1, b_2, \ldots, b_K$) that have been spread with spreading codes, the composite signal (r) being received at a rake receiver which provides a rake receiver output $z_{Rake}=A^H S^H r$, comprising:

at least one processing stage having a respective weighting factor;

wherein said apparatus produces a) first hard-decision values $b_{Rake}=\text{sgn}(z_{Rake})$ based on the rake receiver output $z_{Rake}$, b) first parallel interference cancellation values $z_{Rake}-Fb_{Rake}$ based on $b_{Rake}$, c) second hard-decision values $b_{PIC}=\text{sgn}(z_{Rake}-Fb_{Rake})$ based on the first parallel interference cancellation values, d) first combination values $\tilde{b}$ by combining the hard-decision values $b_{Rake}$ and $b_{PIC}$, e) second parallel interference cancellation values $z_{Rake}-F\tilde{b}$ based on the first combination values $\tilde{b}$ and produces f) third hard-decision values $\tilde{b}_{EPIC}(1)=\text{sgn}(z_{Rake}-F\tilde{b})$ based on the second parallel interference cancellation values such that multiple access interference is minimized, said $\tilde{b}_{EPIC}(1)$ being an output of an equalized parallel interference cancellation (EPIC) detector at a first stage; and wherein:

S=spreading code matrix;

A=channel coefficient matrix;

$(\ )^H$=conjugate transpose operation;

F=off-diagonal cross-correlation matrix.

16. The apparatus of claim 15, wherein the apparatus further g) combines hard-decision values $b_{EPIC}(m)$ (m=2, 3, . . . ,L) at $m^{th}$ stage with the hard-decision values of equalized parallel interference cancellation values $b_{EPIC}(m-1)$ at $(m-1)^{th}$ stage for producing $m^{th}$ combination values $\tilde{b}(m)$; h) produces $(m+1)^{th}$ parallel interference cancellation values based on the $m^{th}$ combination values $\tilde{b}(m)$; and i) produces hard-decision values $b_{EPIC}(m+1)$ at $(m+1)^{th}$ stage based on the $(m+1)^{th}$ parallel interference cancellation values.

17. The apparatus of claim 16, wherein the apparatus implements g) to i) a predetermined number of times.

18. The apparatus of claim 16, wherein the apparatus implements g) to i) until a predetermined bit-error-rate is reached.

19. The apparatus of claim 15, wherein the first combination values are produced by summing the first and second hard-decision values which are weighted by $(1-\omega_1)$ and $\omega_1$, respectively;

wherein $\omega_1$ is a weighting factor.

20. The apparatus of claim 15, wherein, for $k^{th}$ user, in case the first hard-decision value equals the second hard-decision value, the apparatus uses the second hard-decision value as the first combination value, wherein in case the first hard-decision value does not equal the second hard-decision value, the apparatus produces the first combination value for the $k^{th}$ user by weighting the second hard-decision value with $(2\omega_1-1)$, and wherein $\omega_1$ is a weighting factor.

21. The apparatus of claim 16, wherein in implementing g) the apparatus is configured to:

produce the $m^{th}$ combination values by summing the $(m)^{th}$ and $(m+1)^{th}$ hard-decision values which are weighted by $(1-\omega_m)$ and $\omega_m$, respectively;

wherein $\omega_m$ is a weighting factor.

22. The apparatus of claim 16, wherein in implementing g) the apparatus is configured to:

compare the $m^{th}$ hard-decision values and the $(m-1)^{th}$ hard-decision values of the EPIC detector for each user, wherein, for user k, in case the $m^{th}$ hard-decision value equals the $(m-1)^{th}$ hard-decision value, the apparatus uses the $m^{th}$ hard-decision value as the $m^{th}$ combination value, wherein in case the $m^{th}$ hard-decision value does not equal the $(m-1)^{th}$ hard-decision value, the apparatus produces the $m^{th}$ combination value by weighting the $m^{th}$ hard-decision value with $(2\omega_m-1)$, and wherein $\omega_m$ is a weighting factor.

23. The apparatus of claim 22, wherein the $m^{th}$ weighting factor is larger than a $(m-1)^{th}$ weighting factor.

24. The apparatus of claim 15, wherein the apparatus produces the first parallel interference cancellation values by regenerating the induced multiple access interference (MAI) in accordance with:

$$MAI_1 = Fb_{RAKE}$$

$$F = A^H S^H SA - \text{diag}([A^H S^H SA])$$

25. The apparatus of claim 20, wherein the apparatus produces the second parallel interference cancellation values by regenerating the induced multiple access interference (MAI) in accordance with:

$$MAI_2 = F[\omega_1 b_{PIC} + (1-\omega_1) b_{Rake}]$$
$$= F[(2\omega_1 - 1) b_{PIC}] \quad \text{if } [b_{Rake}]_k \neq [b_{PIC}]_k$$
$$= F b_{PIC} \quad \text{if } [b_{Rake}]_k = [b_{PIC}]_k *$$

$$F = A^H S^H SA - \text{diag}([A^H S^H SA]_{ii})$$

26. The apparatus of claim 22, wherein the apparatus produces the $(m+1)^{th}$ parallel interference cancellation values by regenerating the induced multiple access interference (MAI) in accordance with:

$$MAI_{m+1} = F[2\omega_m - 1) b_{EPIC}(m-1)] \quad \text{if } [b_{Rake}]_k \neq [b_{PIC}]_k$$
$$= F b_{EPIC}(m-1) \quad \text{if } [b_{Rake}]_k = [b_{PIC}]_k *$$

$$F = A^H S^H SA - \text{diag}([A^H S^H SA]_{ii}).$$

27. The apparatus of claim 19, wherein the weighting factors at each stage m are varied and predefined in different systems by trial-and-error simulations on training sequences and optimized by adaptive schemes.

28. The apparatus of claim 19, wherein the weighting factors are defined by a power of 2.

29. The method of claim 7, wherein the weighting factors at each stage m are varied and predefined in different systems by trial-and-error simulations on training sequences and optimized by adaptive schemes.

30. The method of claim 7, wherein the weighting factors are defined by a power of 2.

31. The apparatus of claim 21, wherein the weighting factors at each stage m are varied and predefined in different systems by trial-and-error simulations on training sequences and optimized by adaptive schemes.

32. The apparatus of claim 21, wherein the weighting factors are defined by a power of 2.

* * * * *